Figure 1:
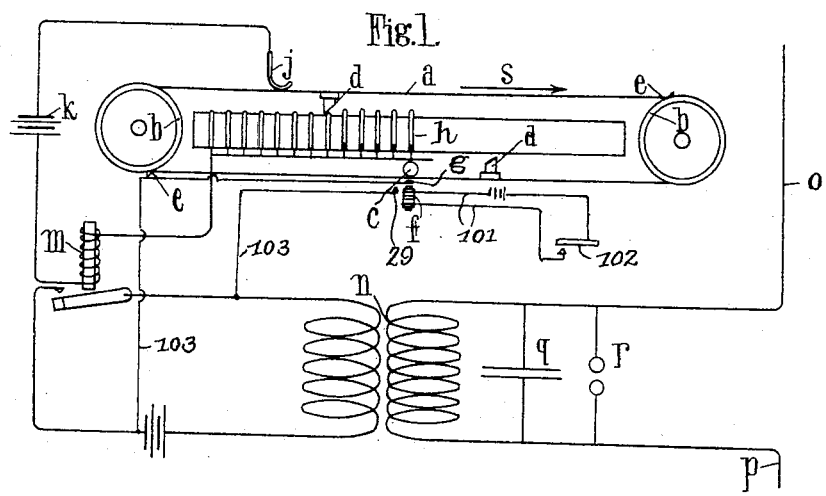

H. KNUDSEN & H. BARTA.
KEYBOARD OPERATING MECHANISM.
APPLICATION FILED MAY 3, 1909.

946,230.

Patented Jan. 11, 1910.

3 SHEETS—SHEET 1.

WITNESSES
J. P. Davis
G. H. Emslie

INVENTORS
Hans Knudsen
Hans Barta
BY
ATTORNEYS

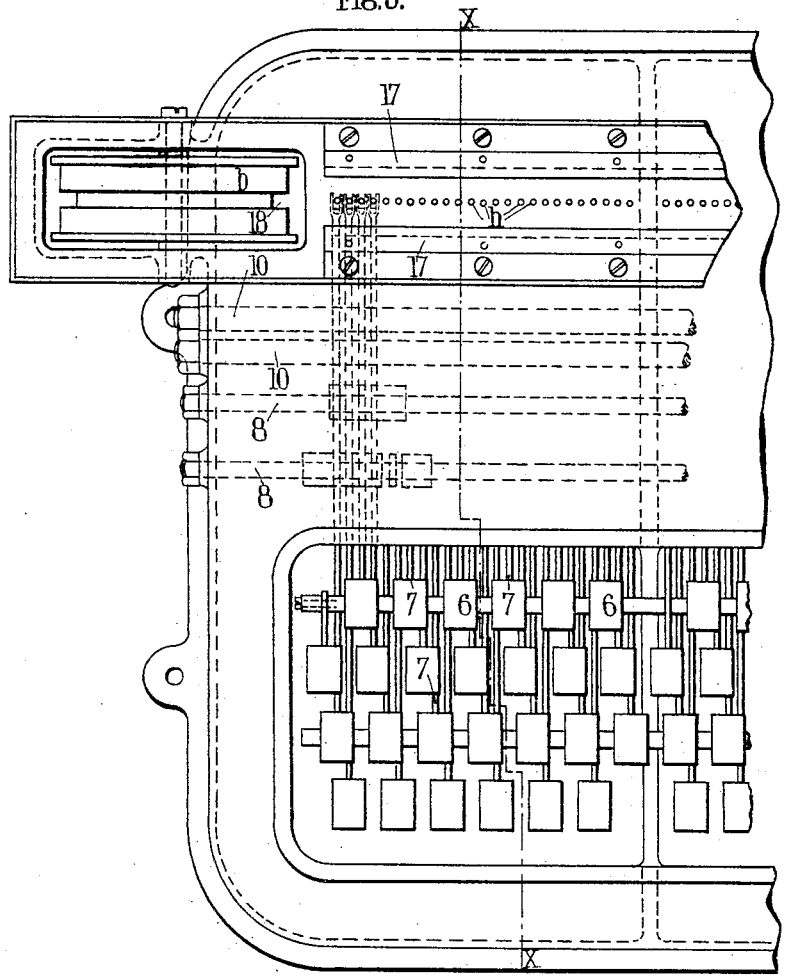

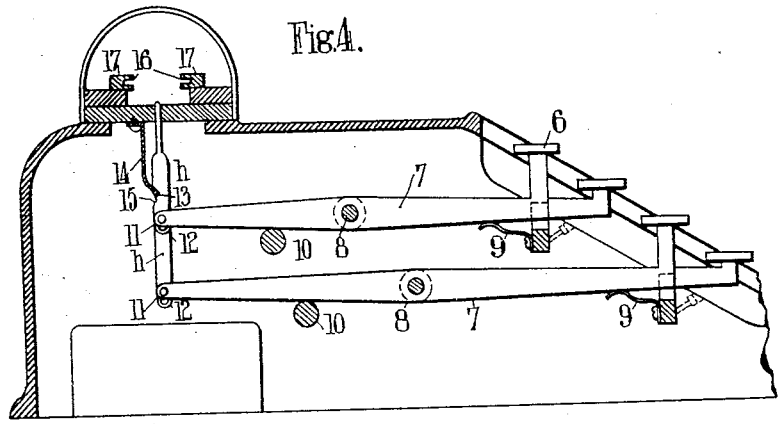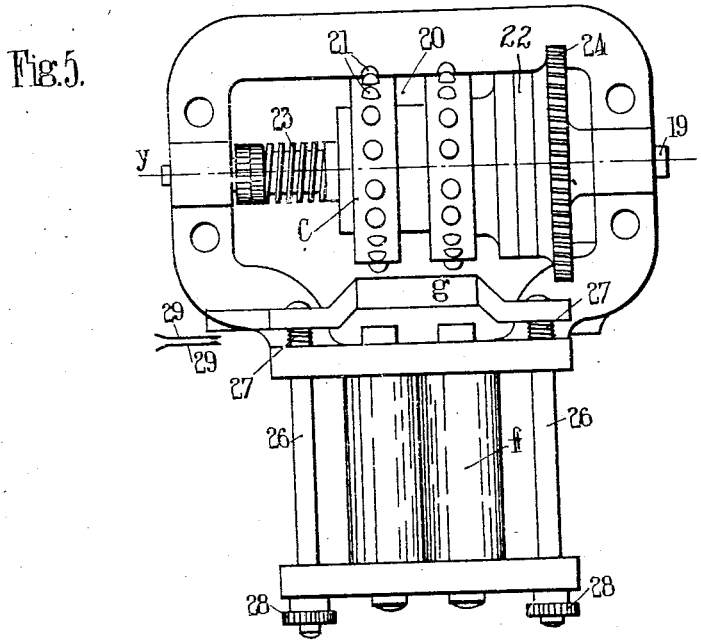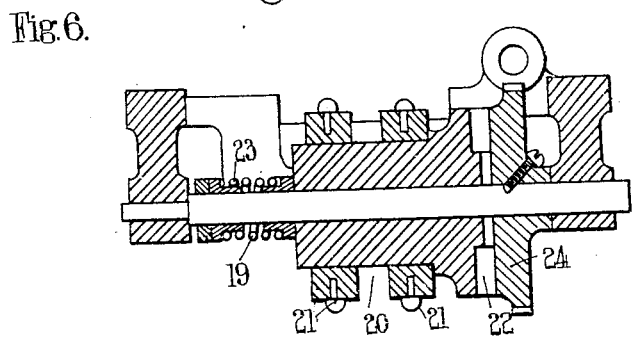

UNITED STATES PATENT OFFICE.

HANS KNUDSEN AND HANS BARTA, OF LONDON, ENGLAND.

KEYBOARD-OPERATING MECHANISM.

946,230.   Specification of Letters Patent.   Patented Jan. 11, 1910.

Application filed May 3, 1909. Serial No. 493,561.

*To all whom it may concern:*

Be it known that we, HANS KNUDSEN, an American citizen, and resident of 12 Cyril Mansions, Battersea Park, London, S. W., England, engineer, and HANS BARTA, a subject of the Emperor of Germany, and resident of 187 Lavender Hill, London, S. W., England, engineer, have invented certain new and useful Improvements in Keyboard-Operating Mechanism, of which the following is a specification.

This invention relates to a system of typesetting by wireless means which can be attached to or worked in combination with linotype machines, or machines of similar construction, and relates particularly to means for the operation of type-setting apparatus of the type in which parts are synchronously moved in the transmitting and receiving machines so that when a contact is made in the transmitting machine a corresponding contact is made in the receiving machine and has for its object to provide improvements in such means. According to this system it is possible to work one transmitting machine only and to receive simultaneously at a distance in the form of words or sentences set in type on a number of different type-setting machines. For instance, one or more steamships each having a wireless installation on board might receive, by this system, the electrical impulses sent out by the transmitting machine at the central station. Any number of receiving machines might be setting type in different places on land and sea at the same time.

Any well-known wireless system may be employed and it may be so tuned and arranged that no foreign messages or signals would interfere or be received.

According to this invention means are provided for individually setting any desired contact pieces in the transmitting machine so that such set contact pieces are adapted to effect a mechanical contact with a moving member, such mechanical contact taking place only when it is desired to make an electrical contact to close an electrical circuit, bringing about the transmission of a signal.

According to one form of this invention an endless band is mounted on rollers in the transmitting machine and provided with two contact fingers. Arranged below the path of said contact fingers is a series of sliding pins connected to the levers of a keyboard similar to the keyboard of a typewriter, said pins being so arranged that when any one (or more) of them is raised it lies in the path of said contact fingers. Means are provided for causing the endless band to travel intermittently and in its travel one of the contact fingers will contact with the raised pin and close an electrical circuit to cause an electrical discharge according to any system of wireless telegraphy. The receiving instrument is provided with a similar endless band and these two bands are arranged to be driven synchronously. The band of the receiving instrument is provided with a pair of brushes adapted to pass over a series of fixed contact pieces corresponding to the series of sliding pins in the transmitting machine.

In use, when contact is made in the transmitting instrument by one of the contact fingers and a sliding pin, owing to the synchronous movement of the two endless bands, contact is made in the receiving instrument between one of the brushes and the corresponding contact piece in the receiving instrument. The series of fixed contact pieces in the receiving machine is connected to a series of electro-magnets adapted to act on the operating levers of the keyboard of a typesetting machine.

The synchronous movement of the endless bands is preferably governed by an electro-magnet in each instrument. On each endless band are a pair of projections each adapted to engage with the armature of the respective magnet. These projections are so arranged that as soon as a contact finger or brush has moved over the series of sliding pins or fixed contacts, one of the projections will engage the armature of the magnet so that the movement of the endless band is arrested until the projection thereon is released from the armature. The release is simultaneously effected in the transmitting and receiving instruments by passing a current through the magnets and drawing the armatures out of the path of the projections on the endless bands. This stoppage and release is effected once in every half revolution of the endless bands. The endless bands may be driven electrically or by clockwork, and means are provided for disconnecting the band from the driving power during the periods of stoppage.

Figure 2:
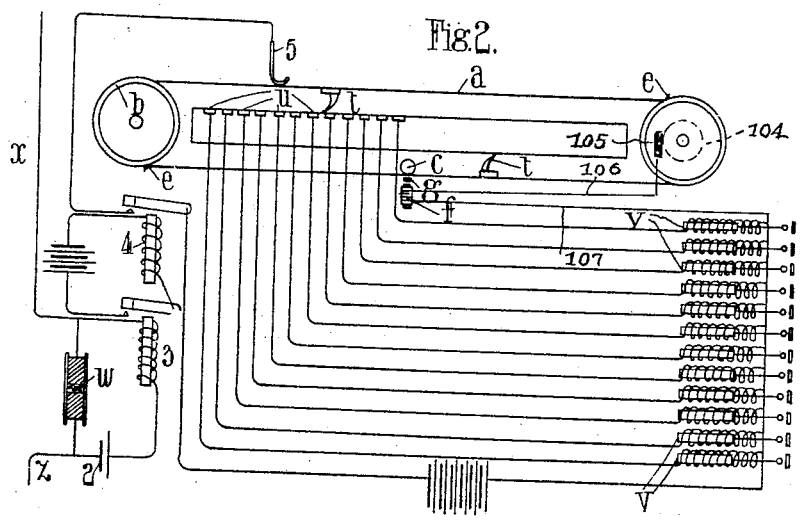

Referring to the drawings, Figures 1 and 2 are diagrammatic examples of the transmitter and receiver respectively. Fig. 3 is a plan of part of one form of transmitting machine, parts being broken away for clearness. Fig. 4 is a cross section on line X—X, Fig. 3. Fig. 5 is an elevation of a detail of the means for driving the band of the transmitter, on an enlarged scale, and Fig. 6 is a cross section thereof on line Y—Y, Fig. 5.

Referring particularly to the diagram of the transmitter shown in Fig. 1, $a$ is an endless metallic band passing over rollers $b$ $b$ and driven by a roller $c$ suitably connected with a source of power such as an electric motor, for instance the roller $c$ may be frictionally driven by the motor. $d$ $d$ are contact fingers, and $e$ $e$ are projections mounted on the band $a$, said fingers and projections being equidistant from one another. $f$ is a magnet having an armature $g$, said armature $g$ being normally adapted to lie in the path of the projections $e$ $e$. $h$ are a series of sliding pins corresponding to the letters of the alphabet or other signs. The pins $h$ are mounted in an insulating frame and are adapted to be individually raised into the path of the contact fingers $d$ $d$. $j$ is a brush contacting with the metallic band $a$ and connected to a battery $k$ and relay $m$, the circuit being closed when one of the fingers $d$ $d$ contacts with one of the sliding pins $h$. $n$ is a sparking coil connected to an aerial wire $o$ and an earth wire $p$. $q$ is a condenser and $r$, $r$ are spark balls. The action of the relay $m$ closes the circuit of the coil $n$ and operates any suitable wireless system to transmit an impulse to the receiver.

In use the roller $c$ is frictionally driven by the motor so as to travel the band $a$ in the direction of the arrow $s$ (Fig. 1). The positions of the contact fingers $d$ $d$ and the projections $e$ $e$ are such that when an upper contact finger $d$ is at the left of the series of pins $h$ a lower projection $e$ is engaged by the armature $g$ of the magnet $f$ and prevents the travel of the band. One (or more) of the pins $h$ corresponding to the sign (or signs) to be transmitted, is raised and a current is sent through the magnet $f$. As soon as the magnet $f$ is energized the armature $g$ is withdrawn from the path of the projection $e$ and allows the roller $c$ to be frictionally driven to travel the belt. When the finger $d$ engages with the raised pin $h$ the circuit of the relay $m$ is closed, thus closing the circuit of the coil $n$ and transmitting an impulse. The onward travel of the finger $d$ first causes the pin $h$ to be pressed down to return said pin $h$ to its normal position and then brings said finger $d$ into contact with the next finger $h$, of the series which is in a raised position, thus transmitting another impulse. When the finger $d$ has reached the right of the series of pins $h$, the second projection $e$ is engaged by the armature $g$ of the magnet $f$ and the travel of the belt is arrested until the magnet $f$ is again energized, and so on.

Referring now to the diagram of the receiver shown in Fig. 2. $a$ is an endless metallic belt and $b$, $b$ and $c$ are rollers corresponding to the belt and rollers in the transmitter. $t$ $t$ are brushes and $e$ $e$ are projections on the band $a$ and corresponding to the contact fingers $d$, $d$ and the projections $e$ $e$ shown in Fig. 1, and $f$ and $g$ are respectively a magnet and its armature as in the transmitter. $u$ is a series of fixed contact pieces mounted in an insulating frame and so placed as to be successively engaged by the brushes $t$ $t$ as they are moved by the belt $a$. The contact pieces $u$ are connected to a series of electro-magnets $v$ disposed so as to act on the levers of the keyboard of a type-setting machine. $w$ is a coherer connected to the aerial wire $x$ by which the electrical impulse is received, and connected to an earth wire $z$. 2 is a battery and 3 a relay in the circuit of the coherer $w$. 4 is a second and stronger relay, the circuit of which is adapted to be closed by the action of the relay 3. The action of the relay 4 closes the circuit of any one of the series of electro-magnets $v$ through a brush 5 contacting with a belt $a$.

In use the belts $a$ $a$ of the transmitter and receiver are driven synchronously by the rollers $c$ $c$ so that when a contact finger $d$ is over or engaging with the first, second, or any one of the series of sliding pins $h$ a brush $t$ is in contact with the corresponding fixed contact piece in the series $u$. If therefore the contact of a finger $d$ and pin $h$ causes an electrical impulse to be discharged as above set forth, that impulse is received by the coherer $w$ and operates the relay 3. This action of the relay 3 closes the circuit of the relay 4, thus closing the circuit of the electro-magnet $v$ and fixed contact piece $u$ corresponding to the pin $h$ which is in contact with the finger $d$ in the transmitter. It will be seen therefore that by raising any desired pin in the transmitter the corresponding contact is made in the receiver and the desired lever of the type-setting machine is actuated.

The synchronism of the belts $a$ $a$ in the transmitter and receiver is maintained by the action of the armatures $g$ $g$ of the magnets $f$, $f$ engaging at each half revolution of said belts with the projections $e$, $e$ thereon. These armatures $g$, $g$ normally lie in the paths of said projections $e$ $e$ so that the travel of the belts is thereby arrested. After each such stoppage the magnets $f$, $f$ are simultaneously energized by an electrical discharge as hereinafter set forth so as to release the projections $e$ $e$ and allow the travel of the belts to continue for a further half revolution. In this manner the synchronism of the travel of the belts $a$ is regulated every half revolution, thus preventing a multiplying error.

Referring now to Figs. 3 and 4, 6 are the operating keys each of which is mounted at 8 and provided with a spring 9 to return the lever after depression to its normal position against a stop 10. Each lever 7 is connected to a sliding pin $h$ by a pin 11 engaging in a slot 12 in the sliding pin $h$. Each sliding pin $h$ has a notch 13 engaged by a spring 14 to hold said pin $h$ in its normal position. When a key 6 is depressed the lever 7 moving on its pivot 8 raises the corresponding pin $h$ through the pin 11 and slot 12 and disengages the spring 14 from the notch 13. The spring 14 then engages with a second notch 15 and holds the pin $h$ in its raised position, while the lever 7, acted on by its spring 9, returns to its normal position, the pin 11 moving in the slot 12. The band $a$ travels in grooves 16, 16 in guides 17, 17 so that the pins $h$ when raised are in the path of the fingers $d$, $d$. The rollers $b$ $b$ are grooved as at 18 for the passage of the fingers $d$ $d$ therearound.

Figs. 5 and 6 show details of the mechanism for driving the band $a$ of the transmitter. The roller $c$ is loosely mounted on a spindle 19 and is grooved as at 20 for the passage of the fingers $d$ $d$ and provided with a series of projections 21 adapted to engage in corresponding holes in the band $a$. 22 is a leather face on the roller $c$ adapted to be pressed, by a spring 23, against a worm wheel 24 fixed to the spindle 19 and meshing with a worm driven by an electric motor or other means. The armature $g$ of the magnet $f$ is mounted on rods 26, 26 adapted to slide in the frame of the magnet $f$. 27, 27 are springs tending to press the armature $g$ into the path of the projections $e$ $e$ on the belt $a$. 28, 28 are nuts screwed on the rods 26, 26 for the purpose of adjusting the position of the armature $g$. One side of said armature is extended and in the path of said extended part are arranged two contact points 29, 29. When the magnet of the transmitter is energized by closing, by means of a key, a local circuit, not shown, the armature $g$ in its movement brings together the two contact points 29, 29 and closes a circuit whereby an electrical impulse is discharged to simultaneously close another circuit (not shown) in the receiver to energize the magnet of the receiver to release the projection $e$ from the armature $g$.

The parts of the receiver correspond closely with those of the transmitter as will be readily understood. Any number of coherers and relays may be employed to operate the different parts and electro-magnets herein described.

The simultaneous actuation of the magnets $f$ is accomplished in the following manner: In Fig. 1, the local circuit 101 of the magnet $f$ is adapted to be closed by the key 102, which is preferably one of the keys 6 (see Fig. 3), thus energizing the magnet, which in attracting the armature, closes the contacts 29, 29 (see Figs. 1 and 5) which are connected by a circuit 103 with the circuit of coil $n$. It will thus be seen that the circuit of the coil $n$ may be closed by the contact points 29, 29 in just the same way as by the relay $m$ so that an impulse is transmitted. At the time that this impulse is transmitted the band $a$ of the receiving machine will be arrested, and a brush $t$, will be at the end of its travel. The drum 104 is mounted on one of the rollers $b$ in the receiving machine, in such manner that when the said impulse is received by the coherer $w$, and the relays 3 and 4 are actuated, a circuit is established through the brush 5, band $a$, brush $t$, drum 104, a brush 105, and circuit 106, 107, through the magnet $f$ and the common wire of the magnets $v$. As the difference of time which is to be corrected by synchronizing means is so small, a brush $t$ will always be in contact with the drum 104, when the key 102 is depressed, to close the local circuit 101, of the magnet $f$ in the transmitting machine.

The transmitter and receiver may also be used with wires instead of the impulses being transmitted and received by wireless means and in such cases the wireless apparatus, e. g. the sparking coil and the coherers and their connections, may be dispensed with.

In the operation of the machine the keys for the signs to be sent must be depressed commencing from the left and working toward the right. When it is desired to transmit a sign on the left of the last one sent the key therefor must not be depressed until the band $a$ has completed one half revolution and has been arrested. For instance, if the letters are arranged alphabetically reading from left to right, and it is desired to transmit the word "wireless", the key for the sign "w" is depressed and the band $a$ is allowed to complete one half revolution and be arrested. The remaining letters are split up into the groups "i", and "r", "e", "l", "e", "s", "s", each group being transmitted by one half revolution of the belt $a$. It will be obvious that if all the keys were depressed for one half revolution of the belt $a$ the finger $d$ would contact successively with the raised fingers $h$ and the reproduced signs would appear as follows:—e, i, l, r, s, w.

We are aware that other forms of the device based upon the same general idea might be made, but we consider as our own all such modifications as fairly fall within the spirit and scope of the invention.

Claims—

1. The combination of a plurality of keyboard mechanisms with means for transmitting the action of one keyboard mechanism to the other keyboard mechanisms, said means comprising transmitting and receiving machines, synchronously moving parts in said transmitting and receiving machines, adapted to establish contacts, said synchronously moving parts including endless belts, a contact finger mounted on one of said endless belts, a series of sliding pins, and means for raising said pins individually into the path of said contact finger, substantially as set forth.

2. The combination of a plurality of keyboard mechanisms with means for transmitting the action of one keyboard mechanism to the other keyboard mechanisms, said means comprising transmitting and receiving machines, synchronously moving parts in said transmitting and receiving machines adapted to establish contacts, said synchronously moving parts including endless belts, a contact finger mounted on the endless belt in said transmitting machine, a series of sliding pins arranged to be engaged by said contact finger, a series of keys and levers connected to said sliding pins, and adapted to individually raise said pins into the path of said contact finger, substantially as set forth.

3. The combination of a plurality of keyboard mechanisms with means for transmitting the action of one keyboard mechanism to the other keyboard mechanisms, said means comprising transmitting and receiving machines, synchronously moving parts in said transmitting and receiving machines, adapted to establish contacts, said synchronously moving parts including endless belts, a contact finger mounted on the endless belt in said transmitting machine, a series of sliding pins, means for raising said pins individually into the path of said contact finger, a brush secured to the belt in said receiving machine, and a series of fixed contact pieces in said receiving machine corresponding to the series of sliding pins in said transmitting machine arranged to be engaged by said brush, substantially as set forth.

4. The combination of a plurality of keyboard mechanisms with means for transmitting the action of one key board mechanism to the other key board mechanisms, said means comprising transmitting and receiving machines; synchronously moving endless belts and electro-magnets and armatures therefor in said transmitting and receiving machines, projections on said endless belts, said armatures being adapted to engage said projections and to arrest the travel of said endless bands, means for energizing said magnets and for withdrawing said armatures from engagement with said projections; movable contact pieces in said transmitting machine, and means for setting and retaining said contact pieces, said means being adapted to operate so that a contact may be automatically effected only when an electrical impulse is to be transmitted through such particular contact pieces, substantially as set forth.

5. The combination of a plurality of keyboard mechanisms with means for transmitting the action of one key-board mechanism to the other key board mechanisms, said means comprising transmitting and receiving machines, synchronously moving belts in said transmitting and receiving machines, a contact finger carried by the belt in said transmitting machine, movable contact pieces in said transmitting machine adapted to be engaged successively by said movable contact finger, and means for individually setting and retaining any of said contact pieces, such set contact pieces being adapted to effect a mechanical contact with one of said synchronously moving parts, such mechanical contact taking place only when it is desired to make an electrical contact to close an electric circuit adapted to bring about the transmission of a signal.

6. The combination of a plurality of key board mechanisms with means for transmitting the action of one key board mechanism to the other key board mechanisms, said means comprising a transmitting and a receiving device, belts in said transmitting and receiving devices adapted to move synchronously, magnets for releasing said belts, and means controlled by the simultaneous movement of the said belts for operating the corresponding key in the receiving device to that depressed in the transmitting device.

7. The combination of a plurality of key board mechanisms with means for transmitting the action of one key board mechanism to the other key board mechanisms, said means comprising a transmitting and a receiving device, belts in said transmitting and receiving devices adapted to move synchronously, magnets for releasing said belts, means for operating the starting magnets of the receiving and transmitting devices simultaneously, an electrical circuit for each key of the transmitting and receiving devices, and means carried by the simultaneously moving belts for closing the circuits of corresponding keys in the transmitting and receiving instruments.

8. The combination of a plurality of key board mechanisms with means for transmitting the action of one key board mechanism to the other key board mechanisms, said means comprising a transmitting device and a receiving device, said transmitting device having a series of movable pins corresponding to the characters to be set up, a movable belt having a contact arranged to complete an electrical circuit through each of said pins, and a magnet normally preventing the movement of the belt but adapted to release the same, said receiving device being provided with a series of keys corresponding to the pins of the transmitting device, a belt and a starting magnet, means arranged to move the belt of the receiving device synchronously with the belt of the transmitting device, and means for operating the starting magnets of the receiving and transmitting machines simultaneously.

HANS KNUDSEN.
HANS BARTA.

Witnesses:
WILLIAM G. E. DAVIES,
FRANK C. RYDE.